Oct. 13, 1925.

C. J. DELEGARD ET AL 1,557,518

BRAKE

Original Filed Aug. 21, 1922

Inventor
CARL J. DELEGARD
JOHN HAWKINSON

By A. E. Carleen.

Attorney

Patented Oct. 13, 1925.

1,557,518

UNITED STATES PATENT OFFICE.

CARL J. DELEGARD AND JOHN HAWKINSON, OF POSKIN, WISCONSIN, ASSIGNORS TO VICTOR DELEGARD AND OSCAR M. WEST, BOTH OF ST. PAUL, MINNESOTA.

BRAKE.

Application filed August 21, 1922, Serial No. 583,135. Renewed March 23, 1925.

*To all whom it may concern:*

Be it known that we, CARL J. DELEGARD and JOHN HAWKINSON, citizens of the United States, residing at Poskin, in the county of Barron and State of Wisconsin, have invented certain new and useful Improvements in Brakes, of which the following is a specification.

This invention relates to hub brake shoes for automobiles and other motor-vehicles, and the main object is to provide adjustable brake shoes which can be spread by means, other than the usual braking means when stopping the car, and from time to time, to compensate for the wear occasioned by continual use. Other objects will be disclosed in the course of the following specification, and are illustrated in the accompanying drawing, in which.

Figure 1:
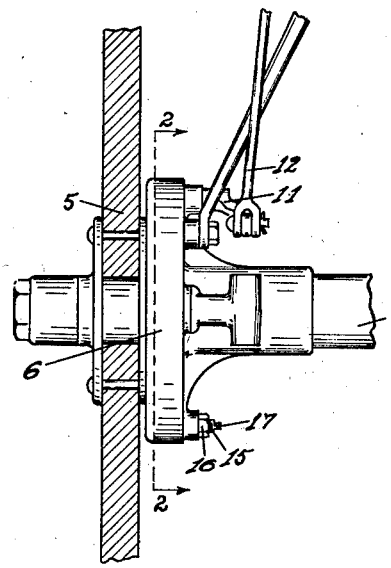
Fig. 1 is a top or plan view of a wheel, hub, brake and axle housing assembly, of common and well known construction, the wheel being shown partly in section.
Figure 4:
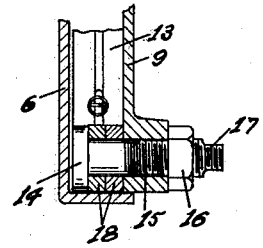
Fig. 4 is a detail sectional view on the line 4—4 in Fig. 2.
Figure 2:
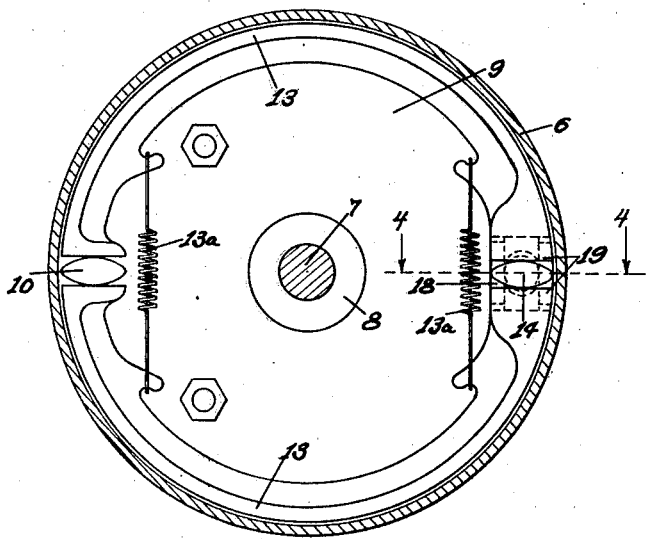
Fig. 2 is an enlarged detail section on the line 2—2 in Fig. 1.
Figure 3:
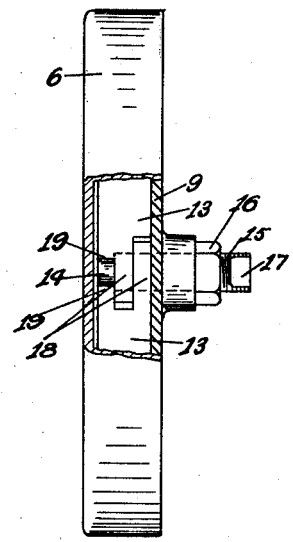
Fig. 3 is an elevation of the brake drum, as seen from the right in Fig. 2, a fractional portion being broken away.

Referring more particularly to the drawing, and by reference characters, 5 designates a motor-vehicle wheel, having a rigidly mounted brake drum 6. The axle 7, which drives the wheel, rotates in the housing 8, on which is mounted the drum closing plate 9. These elements, together with a brake shoe cam 10 which is actuated by an integral lever 11 and a rod 12, and brake springs 13ª, are of common construction and long known in the art.

The invention here in question resides in the particular construction of a pair of brake shoes 13, and an adjusting cam 14 which is diametrically opposed to the cam 10, or at the other ends of the shoes 13. Heretofore it has been customary to make brake shoes of this type either in one piece, split at the cam 10, or in two segments, with the portion or ends opposite to the cam 10 secured by a plain bolt to the plate 9. With such structures, it will be obvious that when the shoes are worn to the extent that the cam can no longer be operative to bind them against the drum, then new and larger shoes must be inserted to make the brake effective.

In overcoming this objection we provide a bolt 15, which has the cam 14 at one end, with threads so that it can be screwed into the plate 9, and a lock nut 16 to lock it with the cam 14 in any desired position, the bolt 15 being flattened at its outer end, as at 17, so that a wrench may be applied to turn it from the outside. The brake shoes 13 are provided with slotted yokes 18 which slidably engage the shank of the bolt 15, and they are further provided with directly opposed shoulders 19 which engage upper and lower points of the cam 14.

When the brakes are first installed the cam 14 is secured in the position indicated in the various figures of the drawing. Now when the shoes are worn until the cam 10 is no longer effective, then it is only necessary to release the nut 16 and give the bolt a slight turn until the cam 14 spreads the shoes until the wear is compensated for, when the nut 16 is tightened, and the cam 10 again becomes effective.

It is understood that suitable modifications may be made in this invention, as herein set forth, provided, however, that such modifications come within the spirit and scope of the appended claims.

Having now therefore fully shown and described our invention, what we claim to be new and desire to protect by Letters Patent is:

1. The combination with a rotatable brake drum and a stationary plate closing the end of the drum, of a pair of oppositely disposed semi-circular brake shoes adapted to frictionally brake against said drum, means at one end of the pair of shoes for spreading the same to effectuate said braking, a cam intermediate the opposite ends of said shoes, a bolt formed integrally with said cam and threaded into said plate, means for locking the bolt in adjusted non-rotatable position in the plate, and a pair of oppositely disposed yokes extending from the cam ends of said shoes to engage over the shank portion of said bolt.

2. The combination with a rotatable brake drum and a stationary plate closing the end of the drum, of a pair of oppositely disposed semi-circular brake shoes adapted to frictionally brake against the drum, means at one end of the pair of shoes for spreading the same to effectuate said braking, oppositely directed overlapping yokes formed integrally with the opposite ends of said shoes, shoulders on the shoes adjacent to said yokes, a bolt extending through said yokes, and a cam member at the end of the bolt for engagement with said shoulders, said bolt being adjustably secured in said plate.

In testimony whereof we affix our signatures.

CARL J. DELEGARD.
JOHN HAWKINSON.